US005493765A

United States Patent [19]

Klebl et al.

[11] Patent Number: 5,493,765

[45] Date of Patent: Feb. 27, 1996

[54] METHOD FOR PRODUCING LENGTHWISE WATERPROOF CABLES

[75] Inventors: Wolfram Klebl, Isernhagen; Günter Titze, Langenhagen, both of Germany

[73] Assignee: kabelmetal electro GmbH, Hanover, Germany

[21] Appl. No.: 345,315

[22] Filed: Nov. 28, 1994

[51] Int. Cl.$^6$ .................................................... B23Q 17/00

[52] U.S. Cl. ........................ 29/407.08; 29/527.2; 427/345

[58] Field of Search .................................. 29/407, 527.2; 427/345; 208/24

[56] References Cited

FOREIGN PATENT DOCUMENTS 2722755 11/1978 Germany .

*Primary Examiner*—David P. Bryant

*Attorney, Agent, or Firm*—Ware, Fressola, Van Der Sluys & Adolphson

[57] ABSTRACT

A method is indicated for producing lengthwise waterproof cables, with a jacket that is formed around the transmitting elements containing the core. The voids in the core and between the core and the jacket are filled with a viscous sealing material, which is pumped from a storage container by a feed pump driven by a speed-controlled electric motor, and supplied to a pressure chamber. The core is passed through the pressure chamber so that the voids in the core are filled with the viscous sealing material. The pressure in the pressure chamber is continuously measured and is kept constant with a regulator. Sealing material leaving the pressure chamber is directed to a catch-container equipped with a level switch. From there it is supplied to the pressure chamber by a feedback pump driven by a speed-controlled electric motor, which is switched on and off by the level switch. Like the speed of the electric motor driving the feed pump, the speed of the electric motor driving the feedback pump is controlled by the regulator.

11 Claims, 1 Drawing Sheet

METHOD FOR PRODUCING LENGTHWISE WATERPROOF CABLES

BACKGROUND OF THE INVENTION

1. Field of the Invention

This invention relates to cables, more particularly, to a method for producing lengthwise waterproof cables.

2. Description of the Prior Art

"Cables" in the sense of the invention can be electrical and optical cables. Accordingly, the transmitting elements located in the core are electrical conductors or optical fibers. Sealing material (water-blocking material) may be introduced into the hollow spaces or voids within a cable to prevent humidity, particularly water, from penetrating the core of the cable in the event of damage to the cable jacket. This is of special significance in communication cables with plastic-insulated conductors, for example, in which water that has penetrated the cable can easily propagate in the lengthwise direction. If such water propagation is not prevented, the water could cause a short-circuit between the individual transmission circuits in joining areas of two cable lengths. Furthermore, the presence of water in the core of a cable totally deteriorates the cable transmission properties. For that reason, methods and devices have been developed for sealing the cores of cables. For example, a sealing material may be used to impregnate the core of cable to waterproof the cable. The sealing material is provided in the hollow spaces in the core and between the core and jacket. The sealing material may be a petroleum-type mass, called "petrolatum" which is highly viscous at room temperature, and can be liquefied by adding heat.

A method for making a cable containing a sealing material is known from German Document No. DE-PS 27 22 755, for instance. The core of a cable is passed through a pressure chamber containing the sealing material. The sealing material is pressed into and around the core before the jacket is applied. With this method, the pressure in the pressure chamber is kept constant by means of a regulator, to ensure that sufficient petrolatum reaches the core of the cable. A measuring device is installed to measure the pressure in the pressure chamber. The output of the measuring device is supplied to the regulator. The regulator controls the rpm of an electric motor driving a feed pump which is used to pump the sealing material into the pressure chamber. In spite of this pressure control, it is unavoidable that part of the sealing material escapes from the pressure chamber. In particular, it is carried out by the core itself and exits through the pressure chamber opening from which the core emerges.

SUMMARY OF THE INVENTION

An object of the invention is the manufacture of a waterproof cable impregnated with a sealing material such that during manufacture of the cable excess sealing material, emerging from a pressure chamber used to impregnate the core of the cable with sealing material, is reused.

It has been found that the foregoing object can be readily attained by directing the sealing material emerging from the pressure chamber to a catch-container equipped with a level switch, returning the sealing material from the catch-container to the pressure chamber by a feedback pump driven by an rpm-controlled (speed-controlled) electric motor, which is switched on and off by the level switch, and controlling the rpm (speed) of the electric motor driving the feedback pump by a regulator attached to the pressure tank. The regulator is also used to control the speed of an electric motor driving a feed pump that maintains the pressure of the pressure chamber.

With this method, excess sealing material emerging from the pressure chamber is caught and directly reused by returning it to the pressure chamber. Since the two electric motors of the feed pump on the one hand, and the feedback pump on the other, are controlled by the same regulator, it is ensured that the pressure in the pressure chamber remains constant when petrolatum is returned from the catch-container. In a preferred configuration, control of the feedback pump's electric motor takes precedence over the control of the feed pump's electric motor. This can be easily achieved with a diode, which is installed in a control circuit between the regulator and the electric motor driving the feed pump.

The foregoing and other objects, features and advantages of the present invention will become more apparent in light of the following detailed description of exemplary embodiment thereof, as illustrated in the accompanying drawing.

DETAILED DESCRIPTION OF THE INVENTION

Figure 1:
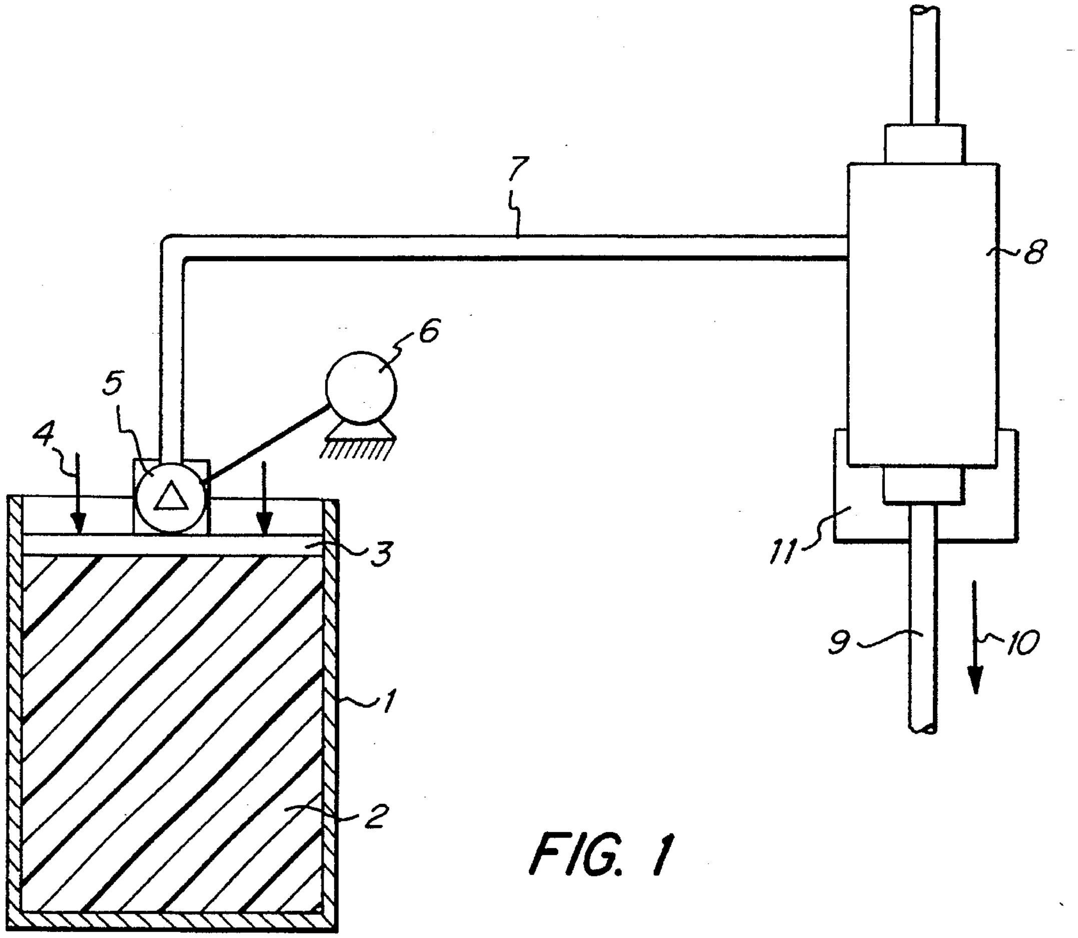
FIG. 1 is a schematic diagram of a device used for sealing the core of a cable.

Referring to FIG. 1, a storage container 1 is filled with sealing material 2, e.g. petrolatum. The storage container 1 has a pressure plate 3 on which pressure can be exerted in the direction of the arrows 4 to force the petrolatum 2 from the container 1. A central aperture (not shown) is located in the pressure plate 3, through which the petrolatum 2 can exit. A feed pump 5 has its supply connected in communication with the aperture. The feed pump 5 is driven by a speed-controlled electric motor 6, hereafter called "feed pump motor", which is preferably designed as a direct current (DC) motor. The petrolatum 2 conveyed by the feed pump 5 is brought to a pressure chamber 8 through a line 7. In the pressure chamber 8, sufficient pressure is exerted by the petrolatum 2 to press it into and around the core 9 of a cable passing through the pressure chamber 8 in the direction of arrow 10. As is known in the art, a jacket (not shown) is applied over the core 9 after it exits the pressure chamber 8.

A catch-container 11 is located on the side of the pressure chamber 8 where the core 9 exits, wherein excess petrolatum 2 emerging from the pressure chamber 8 is caught. Petrolatum 2 that emerges from other areas of the pressure chamber 8 is also directed to the catch-container 11. The inlet opening of the pressure chamber 8 into which the core 9 is fed is such an area, for example. The control of the petrolatum transportation from the storage container 1 and the catch-container 11 into the pressure chamber 8 is described in greater detail hereinafter with reference to FIG. 2.

Figure 2:
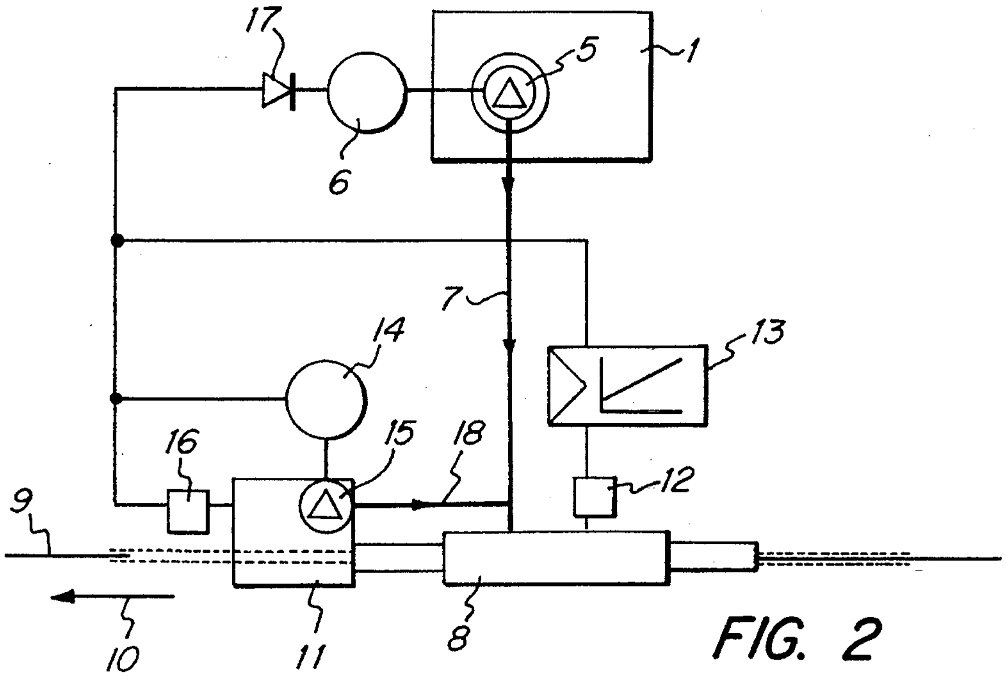
FIG. 2 is a more detailed schematic diagram of the device of FIG. 1.

Referring to FIG. 2, the pressure of the petrolatum 2 (FIG. 1) inside of pressure chamber 8 is measured by a measuring device 12, which can be designed for instance as a pressure sensor, in which a strain-gauge measuring bridge is located. An output signal of the measuring device 12 is an electric voltage that corresponds to the actual pressure inside of pressure chamber 8. This electric voltage is fed to a regulator 13. A specified pressure value, which must always be maintained inside the pressure chamber 8, is supplied by a constant voltage source (not shown) as an electric voltage for example, which is also fed to regulator 13. This specified value of the pressure, and the actual value supplied by the measuring device 12, are compared by the regulator 13. In the event of a difference between the actual and the specified value, the output value produced by the regulator 13 is changed, which is an electric voltage that can range between 0 and 10 V, for example.

The feed pump motor 6 is connected to the regulator 13. In addition, a speed-controlled electric motor 14, hereafter called "feedback motor" is connected to the regulator 13. The feedback motor 14 drives a feedback pump 15 located in the catch-container 11. The feedback motor 14, and thereby feedback pump 15, are switched on and off by a level switch 16. A diode 17 is installed in the control circuit between the regulator 13 and the feed pump motor 6. The output value of the regulator 13 for feed pump motor 6 is reduced by the constant voltage drop at the diode 17.

The operation of the invention is best understood by example. Referring to FIGS. 1 and 2, when the device is energized, first the feed pump motor 6 is switched on, and thereby also the feed pump 5, which transports petrolatum 2 from the container 1 through the line 7 into the pressure chamber 8. At the same time, the core 9 is drawn in the direction of arrow 10 through the pressure chamber 8, so that the core 9 is continuously filled with the petrolatum 2. During the operation, the pressure inside of pressure chamber 8 is constantly measured by the measuring device 12.

If the pressure, as indicated by the measuring device 12, deviates from the specified value, the speed of feed pump motor 6 is changed by the regulator 13 in such a way, that the actual value of the pressure in the pressure chamber 8 matches the specified value. Since this transmission is made electrically, a very fast and immediate regulation of the pressure inside of pressure chamber 8 is made possible.

Excess petrolatum emerging from the pressure chamber 8 is directed to the catch-container 11, which gradually fills up. As soon as the petrolatum level in the catch-container 11 reaches the level switch 16, the level switch 16 switches on the feedback motor 14. The feedback pump 15, which is driven by the feedback motor 14, returns petrolatum to the pressure chamber 8 through a line 18, until the feedback motor 14 is switched off by the level switch 16.

The speeds of the feed pump motor 6 and the feedback motor 14 are controlled by the regulator 13. The respective speeds are adjusted to maintain the specified value of the pressure in pressure chamber 8. To that end, the output value of regulator 13 is reduced as soon as the feedback pump 15 begins to operate. In a preferred configuration, the speed of the feedback motor 14 is adjusted before the feed pump motor 6, so that the return of the petrolatum from the catch-container 11 takes place as fast as possible. This control is accomplished using a diode 17 installed in the control circuit of feed pump motor 6, whose constant voltage drop reduces the output value of voltage supplied by the regulator 13 to the feed pump motor 6. The feed pump motor 6 therefore runs at a lower speed than the feedback motor 14.

In this way, the desired amount of petrolatum is quickly returned from the catch-container 11 to the pressure chamber 8. The feedback motor 14 is then switched off by the level switch 16, so that the feedback pump 15 no longer operates. The feed pump motor 6 then runs again at a higher speed in accordance with the output value of regulator 13.

In a preferred configuration, the level switch 16 is a tuning-fork switch. For effectiveness, it is useful to supply the level switch 16 with hot air during the operation of feedback pump 15, so that no petrolatum adheres to it. To make transportation of the petrolatum from the catch-container 11 easier, the latter can be heated to lower the viscosity of the petrolatum.

With this method, the pressure inside of the pressure chamber 8 can be specified for a minimum required value, which can take place through a corresponding adjustment of the specified value at the not shown constant voltage source. The adjustment of the pressure is independent of the speed that the core 9 is drawn through the pressure chamber 8. In this way, the pressure is also adjusted if no petrolatum 2 at all is drawn, i.e. when the core 9 stands still.

Although the invention has been described and illustrated with respect to exemplary embodiments thereof, it should be understood by those skilled in the art that the foregoing and various other changes, omissions and additions may be made therein and thereto, without departing from the spirit and scope of the present invention.

What is claimed is:

1. A method for producing a core for use within a jacket of a lengthwise waterproof cable, the core containing transmitting elements, the method comprising the steps of:

providing a storage container filled with a viscous sealing material;

pressurizing a pressure chamber with said sealing material by pumping said sealing material from said storage container into said pressure chamber with a feed pump, said pressure chamber having an inlet and an outlet;

passing the core through said pressure chamber between said inlet and outlet thereby filling existing voids in the core with said sealing material;

measuring the actual pressure in said pressure chamber and providing an actual pressure signal indicative thereof to a regulator;

comparing said actual pressure signal to a desired pressure signal indicative of a desired pressure of said pressure chamber;

controlling said feed pump to maintain the pressure in said pressure chamber equal to the desired pressure;

directing any excess of said sealing material emerging from said pressure chamber into a catch-container;

returning said sealing material in said catch-container to said pressure chamber by pumping said sealing material with a feedback pump; and controlling said feedback pump to maintain the pressure in said pressure chamber equal to the desired pressure.

2. A method as claimed in claim 1, wherein said feed pump and said feedback pump are driven by speed-controlled electric motors, and wherein the steps of controlling said feed pump and controlling said feedback pump are performed by controlling the speeds of said speed-controlled electric motors, respectively.

3. A method as claimed in claim 2, wherein said catch-container is equipped with a level switch, the method further comprising the step of switching said feedback pump on and off by said level switch.

4. A method as claimed in claim 3, wherein said level switch is a tuning-fork switch.

5. A method as claimed in claim 4, further comprising the step of supplying hot air to said tuning-fork switch.

6. A method as claimed in claim 2, wherein said steps of comparing said actual pressure signal to a desired pressure signal and controlling the speeds of said speed-controlled electric motors are performed by a regulator.

7. A method as claimed in claim 6 wherein the control by said regulator of said feedback pump speed-controlled electric motor takes precedence over the control by said regulator of said feed pump speed-controlled electric motor.

8. A method as claimed in claim 7, wherein a diode is installed in a control circuit between said regulator and said feed pump speed-controlled electric motor.

9. A method as claimed in claim 1, further comprising the step of heating said catch-container.

10. A method as claimed in claim 1, wherein said viscous sealing material is petrolatum.

11. A method as claimed in claim 1, wherein the control of said feedback pump takes precedence over the control of said feed pump.

* * * * *

UNITED STATES PATENT AND TRADEMARK OFFICE

CERTIFICATE OF CORRECTION

PATENT NO. : 5,493,765

DATED : February 27, 1996

INVENTOR(S) : Klebl et al.

It is certified that error appears in the above-indentified patent and that said Letters Patent is hereby corrected as shown below:

On the Title page, please change Assignee Data to read -- [73] Assignee: "Hanover" should be --Hannover--.

Signed and Sealed this

Eleventh Day of June, 1996

Attest:

BRUCE LEHMAN

*Attesting Officer* *Commissioner of Patents and Trademarks*